United States Patent
Yamada (10) Patent No.: US 7,855,813 B2
(45) Date of Patent: Dec. 21, 2010

(54) SUPPORT STAND, SCANNER DEVICE, AND IMAGE RECORDING APPARATUS

(75) Inventor: Masatomo Yamada, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1132 days.

(21) Appl. No.: 11/521,459

(22) Filed: Sep. 15, 2006

(65) Prior Publication Data
US 2007/0279709 A1    Dec. 6, 2007

(30) Foreign Application Priority Data
Jun. 1, 2006    (JP)    ............... 2006-153223

(51) Int. Cl.
*H04N 1/04*    (2006.01)

(52) U.S. Cl. .............. 358/474; 358/497; 358/498; 399/227; 399/113; 271/160; 271/265.01

(58) Field of Classification Search .......... 358/474, 358/497, 496, 486, 501, 498; 399/101, 349, 399/297, 227, 222; 271/160, 265.01
See application file for complete search history.

(56) References Cited

U.S. PATENT DOCUMENTS

| | | | | |
|---|---|---|---|---|
| 5,251,072 A | * | 10/1993 | Fukuoka et al. | 359/896 |
| 5,745,253 A | * | 4/1998 | Muramatsu et al. | 358/408 |
| 6,384,940 B1 | * | 5/2002 | Kawai et al. | 358/474 |
| 6,628,433 B1 | * | 9/2003 | Westcott et al. | 358/474 |
| 7,359,097 B2 | * | 4/2008 | Oomori et al. | 358/498 |
| 7,433,090 B2 | * | 10/2008 | Murray | 358/474 |
| 7,538,914 B2 | * | 5/2009 | Ando | 358/496 |
| 2001/0040705 A1 | * | 11/2001 | Yokota | 358/474 |
| 2002/0044305 A1 | * | 4/2002 | Kawai et al. | 358/474 |
| 2003/0112478 A1 | * | 6/2003 | Chang | 358/498 |
| 2006/0209364 A1 | * | 9/2006 | Nagatani | 358/474 |
| 2008/0024839 A1 | * | 1/2008 | Okada et al. | 358/497 |
| 2009/0109504 A1 | * | 4/2009 | Hirokawa | 358/498 |

FOREIGN PATENT DOCUMENTS

| | | |
|---|---|---|
| JP | 10-327275 A | 12/1998 |
| JP | 11-164076 A | 6/1999 |
| JP | 11-258885 A | 9/1999 |
| KR | 1020000055983 A | 9/2000 |
| KR | 1020040006624 A | 1/2004 |

\* cited by examiner

*Primary Examiner*—Negussie Worku
(74) *Attorney, Agent, or Firm*—Sughrue Mion, PLLC (57) ABSTRACT

A support stand includes: scanner attachment portions to which one end portion and the other end portion of a scanner along a scanning direction are attached; a scanner fixing structure that fixes the one end portion of the scanner to the scanner attachment portions; and a scanner attachment structure that attaches the other end portion of the scanner to the scanner attachment portions such that the other end portion of the scanner is movable along the scanning direction.

16 Claims, 8 Drawing Sheets

SUPPORT STAND, SCANNER DEVICE, AND IMAGE RECORDING APPARATUS

BACKGROUND

1. Technical Field

The present invention relates to a support stand, a scanner device, and an image recording apparatus, and in particular to a support stand that can prevent a scanner from being deformed in a scanning direction by thermal expansion, a scanner device, and an image recording apparatus.

2. Related Art

Digital image recording apparatus such as digital copiers and digital facsimile machines are disposed with a scanner that reads a document image and converts the document image into image signals, an electrophotographic printer that forms an image on a recording medium such as recording paper on the basis of the image signals from the scanner, and a rack to which the scanner and the printer are attached.

In such digital image recording apparatus, the rack is disposed with a scanner mounting stand to which the scanner is attached and a printer mounting stand to which the printer is attached. Ordinarily, the scanner mounting stand is positioned above the printer mounting stand such that the scanner is attached above the printer. In consideration of the ease of operation by an operator, a paper discharge tray, into which the recording paper on which an image has been recorded by the printer is discharged, is disposed in the portion between the scanner and the printer—that is, on the upper surface of the printer.

In recent years, it has become common to integrally mold the casing and the frame of the scanner with resin for the purpose of reducing weight.

However, because the scanner emits heat when it is used for a long period of time, the casing and the frame thermally expand. Consequently, when the scanner is simply fixed to the rack, there is the problem that the frame of the scanner becomes deformed by thermal expansion and the scanner becomes unable to properly scan images.

SUMMARY

A first aspect of the present invention provides a scanner support stand comprising: scanner attachment portions to which one end portion and the other end portion of a scanner along a scanning direction are attached; a scanner fixing structure that fixes the one end portion of the scanner to the scanner attachment portions; and a scanner attachment structure that attaches the other end portion of the scanner to the scanner attachment portions such that the other end portion of the scanner is movable along the scanning direction.

BRIEF DESCRIPTION OF THE DRAWINGS

An exemplary embodiment of the present invention will be described in detail based on the following figures, wherein.

DETAILED DESCRIPTION

A digital copier 2 that is an example of an image recording apparatus pertaining to the present invention will be described below with reference to the drawings.

Figure 1:
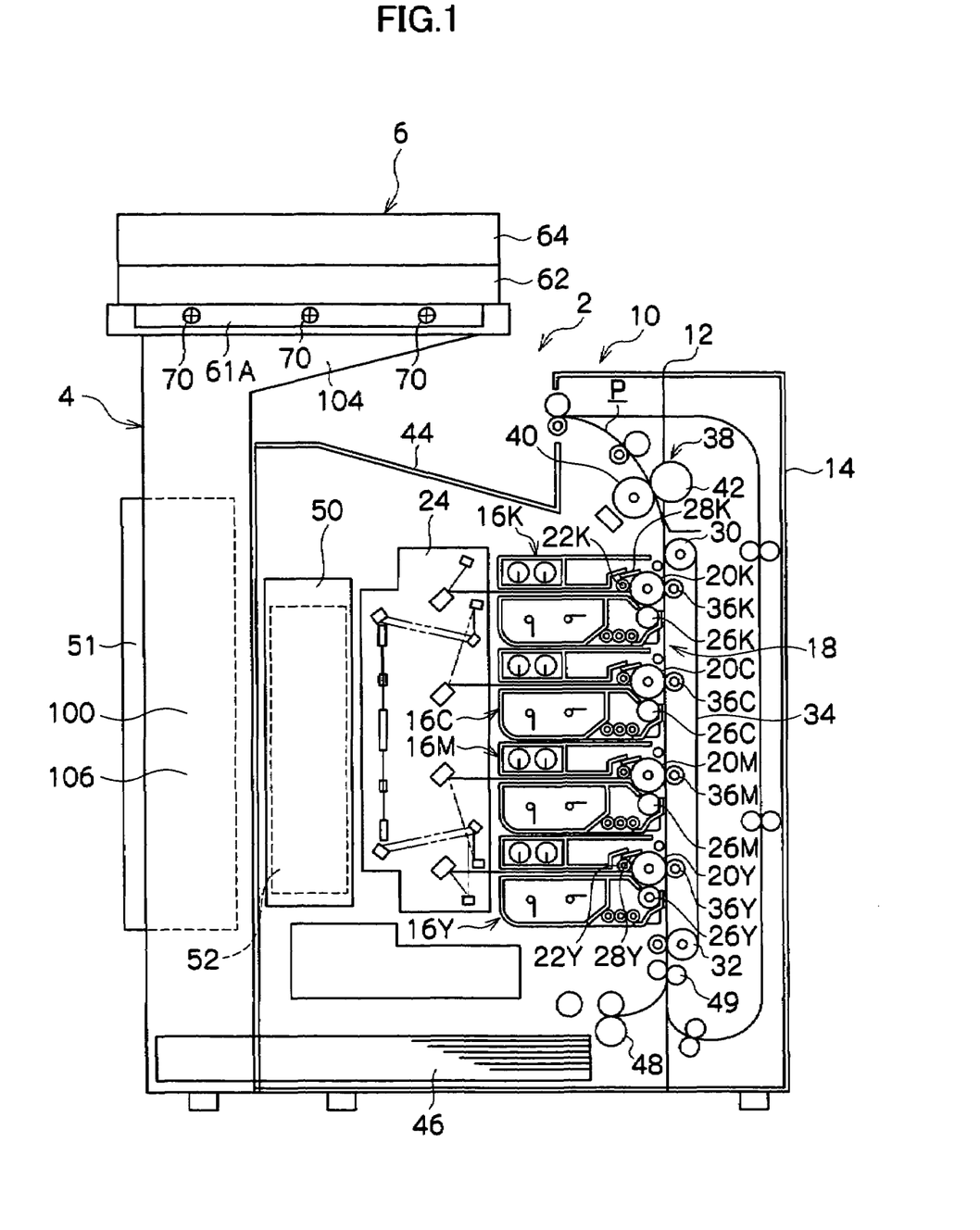
FIG. 1 is a schematic side view showing the overall configuration of a digital copier pertaining to the exemplary embodiment.
Figure 2:
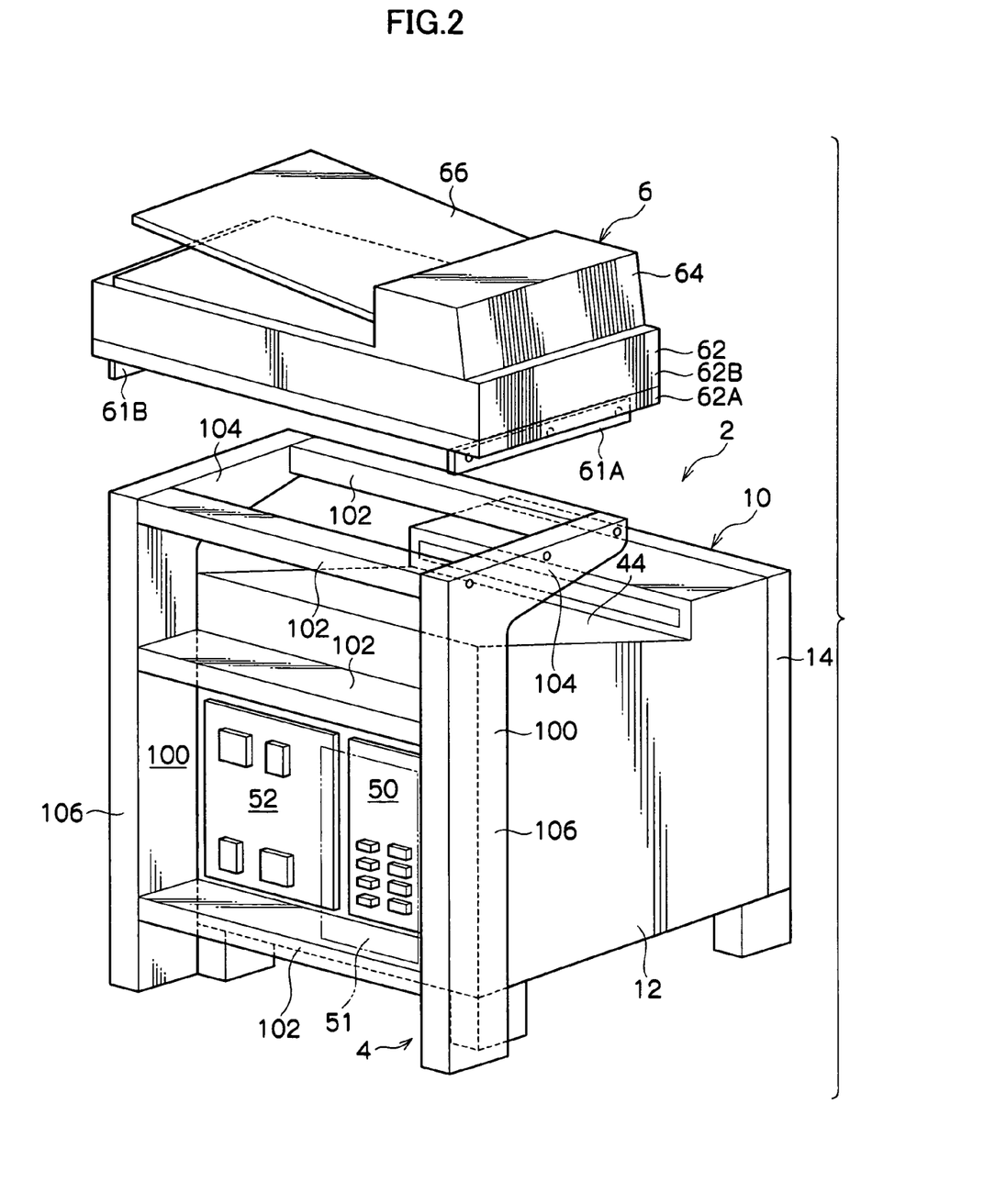
FIG. 2 is a partial exploded view showing the relative positional relationship between a scanner, a support stand, and a printer configuring the digital copier pertaining to the exemplary embodiment.

As shown in FIG. 1 and FIG. 2, the digital copier 2 pertaining to the exemplary embodiment of the invention is configured by a scanner 6, a support stand 4 that attaches to the scanner 6 from below, and a printer 10 that prints an image read by the scanner 6. The printer 10 corresponds to an image forming unit in the present invention.

First, the printer 10 will be described.

As shown in FIG. 1, the printer 10 includes: development units 16Y to 16K that are disposed in the vertical direction in the order of yellow (Y), magenta (M), cyan (C), and black (K) from the bottom such that full-color printing is possible; an optical unit 24; a body frame 12 that houses the development units 16Y to 16K such that the development units 16Y to 16K can be loaded and unloaded; and a cover 14 that is disposed such that it can be opened and closed with respect to the body frame 12 and configures an integral casing with the body frame 12 when the cover 14 is closed. A transfer conveyance unit 18 disposed with a conveyor belt 34 that can attract and convey recording paper P is detachably attached to the cover 14.

Each of the development units 16Y to 16K includes: a roll-like image carrier 20 (20Y to 20K) whose surface is irradiated by the optical unit 24 on the basis of image data such that a latent image resulting from a difference in electrostatic potential is formed on the surface of the image carrier 20; a charge roller 22 (22Y to 22K) that uniformly charges the surface of the image carrier 20 (20Y to 20K); a development roller 26 (26Y to 26K) that selectively transfers toner to the latent image to make the latent image visible; and a cleaning member 28 (28Y to 28K) that rubs against the image carrier 20 (20Y to 20K) after the toner image has been transferred and cleans (eliminates) toner remaining on the image carrier 20 (20Y to 20K).

The image carrier 20 (20Y to 20K) includes a photoconductor layer on its surface. After the surface of the image carrier 20 (20Y to 20K) has been uniformly charged by the charge roller 22 (22Y to 22K), it is exposed to laser light (image light) emitted from the optical unit 24, and the electric potential of the portion exposed to the laser light becomes attenuated, whereby an electrostatic latent image (image) is formed. It will be noted that the charge roller 22 (22Y to 22K) substantially uniformly charges the surface of the image carrier 20 (20Y to 20K) as a result of the charge roller 22 coming into contact with the image carrier 20 (20Y to 20K), a voltage being applied between the charge roll 22 and the image carrier 20, and discharge arising in the minute gap in the vicinity of the contact portion.

The optical unit 24 scans flashing laser light on the surface of the image carrier 20 (20Y to 20K) and forms an electrostatic latent image based on image data on the surface of the image carrier 20 (20Y to 20K). It will be noted that it is conceivable for the optical unit 24 to be one where light-emitting elements such as LEDs are arrayed and caused to flash on the basis of image data.

The development roller 26 (26Y to 26K) is disposed in proximity to and facing the image carrier 20 (20Y to 20K), and is configured such that a development bias voltage is applied between the development roller 26 (26Y to 26K) and the image carrier 20 (20Y to 20K). Thus, a development bias electric field is formed between the development roller 26 (26Y to 26K) and the image carrier 20 (20Y to 20K), and the toner, which has an electric charge, moves to the exposed portion on the image carrier 20 (20Y to 20K) to form a visible image.

The transfer conveyance unit 18 includes the conveyor belt 34, which is stretched around at least a drive roller 30 and a driven roller 32. Four transfer rollers 36 (36Y to 36K) are disposed at predetermined intervals in correspondence to the respective colors of yellow, magenta, cyan, and black at predetermined positions between the drive roller 30 and the driven roller 32 at the inner side of the conveyor belt 34.

The transfer roller 36 (36Y to 36K) is disposed facing the image carrier 20 (20Y to 20K) with the conveyor belt 34 sandwiched therebetween when the cover 14 is closed. The transfer roller 36 (36Y to 36K) is configured to form a transfer electric field between itself and the image carrier 20 (20Y to 20K) to cause the toner image (unfixed image) on the surface of the image carrier 20 (20Y to 20K) to be transferred onto the recording paper P that is attracted to and conveyed by the conveyor belt 34 and passes between the transfer roller 36 (36Y to 36K) and the image carrier 20 (20Y to 20K).

A fixing device 38 is disposed downstream of the development units 16Y to 16K in the conveyance direction of the recording paper P—or in other words, in the upper portion of the body frame 12.

The fixing device 38 includes a heat roller 40 and a pressure roller 42 whose peripheral surfaces face each other and are brought into contact with each other (nipped) with a predetermined pressure. The fixing device 38 includes the function of fixing the toner image to the recording paper P as a result of the heat roller 40 and the pressure roller 42 heating and pressuring the unfixed toner image that has been transferred onto the recording paper P.

The recording paper P to which the toner image has been fixed as a result of being heating and pressured by the fixing device 38 (the heat roller 40 and the pressure roller 42) is discharged into a paper discharge tray 44. Additionally, after the toner image has been transferred to the recording paper P, the surface of the image carrier 20 (20Y to 20K) is cleaned by the cleaning member 28 (28Y to 28K) such that the image carrier 20 (20Y to 20K) is prepared for the next image creation process.

Further, a paper supply cassette 46 is loaded in the lower portion of the body frame 12 such that the paper supply cassette 46 can be freely loaded and unloaded. The paper supply cassette 46 is configured such that it can be pulled out in the opposite direction of the direction in which the recording paper P is fed and such that it can appropriately supply the recording paper P.

A paper supply roller pair 48 that feeds the recording paper P one sheet at a time from the paper supply cassette 46 is disposed in the vicinity of the leading end portion of the paper supply cassette 46. The recording paper P fed from the paper supply roller pair 48 is fed at a predetermined timing by a registration roller pair 49 to the attracting/conveying surface of the conveyor belt 34 and conveyed to transfer positions of the toner images of the respective colors.

In the printer 10, the transfer conveyance unit 18 is disposed adjacent to the side where the image carriers 20Y to 20K of the development units 16Y to 16K are disposed. The transfer conveyance unit 18 includes the drive roller 30 that is rotatably supported at the upper end portion, the driven roller 32 that is rotatably supported at the lower end portion, and the conveyor belt 34 that is wrapped and stretched around the drive roller 30 and the driven roller 32 and can electrostatically attract the recording paper P. The transfer rollers 36Y to 36K are supported at predetermined intervals for the respective colors of yellow, magenta, cyan, and black at the inner side of the conveyor belt 34 between the drive roller 30 and the driven roller 32. The transfer rollers 36Y to 36K are brought into contact with the image carriers 20Y to 20K with a predetermined pressure, with the conveyor belt 34 sandwiched therebetween, and rotate following the travel of the conveyor belt 34.

As shown in FIG. 1 and FIG. 2, the printer 10 also includes: a printer control board 50 that controls the development units 16Y to 16K, the transfer conveyance unit 18, the optical unit 24, the fixing device 38, and the like; a scanner control board 51 that transmits and receives image signals between the printer 10 and the scanner 6 and controls the scanner 6; and a power board 52.

Next, the support stand 4 and the scanner 6 will be described.

As shown in FIG. 1 and FIG. 2, the support stand 4 includes a pair of scanner attachment portions 100, which are disposed adjacent to the printer 10 and to which the scanner 6 is attached, and four horizontal beams 102 that couple together the scanner attachment portions 100.

Each of the scanner attachment portions 100 includes a support column 106, which is disposed standing along the printer 10, and an arm-shaped portion 104, which extends in the horizontal direction above the discharge tray 44 of the printer 10 from the top portion of the support column 106. As shown in FIGS. 3A and 3B, FIGS. 5A and 5B, and FIGS. 6A and 6B, the arm-shaped portions 104 are channel members whose bottom is open. The scanner 6 is placed on a frame that is formed by the two arm-shaped portions 104 and the horizontal beams 102 connecting the arm-shaped portions 104.

As shown in FIG. 2, FIG. 7, FIGS. 8A and 8B, the scanner 6 includes: a document platen 62 on which a document whose image is to be read is placed; an image reading carriage 60 that is a document reading unit that moves in the direction of arrow a along a pair of rails 63 disposed inside the document platen 62 and reads an image; a document feeding device 64 that corresponds to a document feeding unit and is placed on the document platen 62 such that the document feeding device 64 can be opened and closed; and a document platen 66 on which a document to be fed to the document feeding device 64 is placed.

Figure 7:
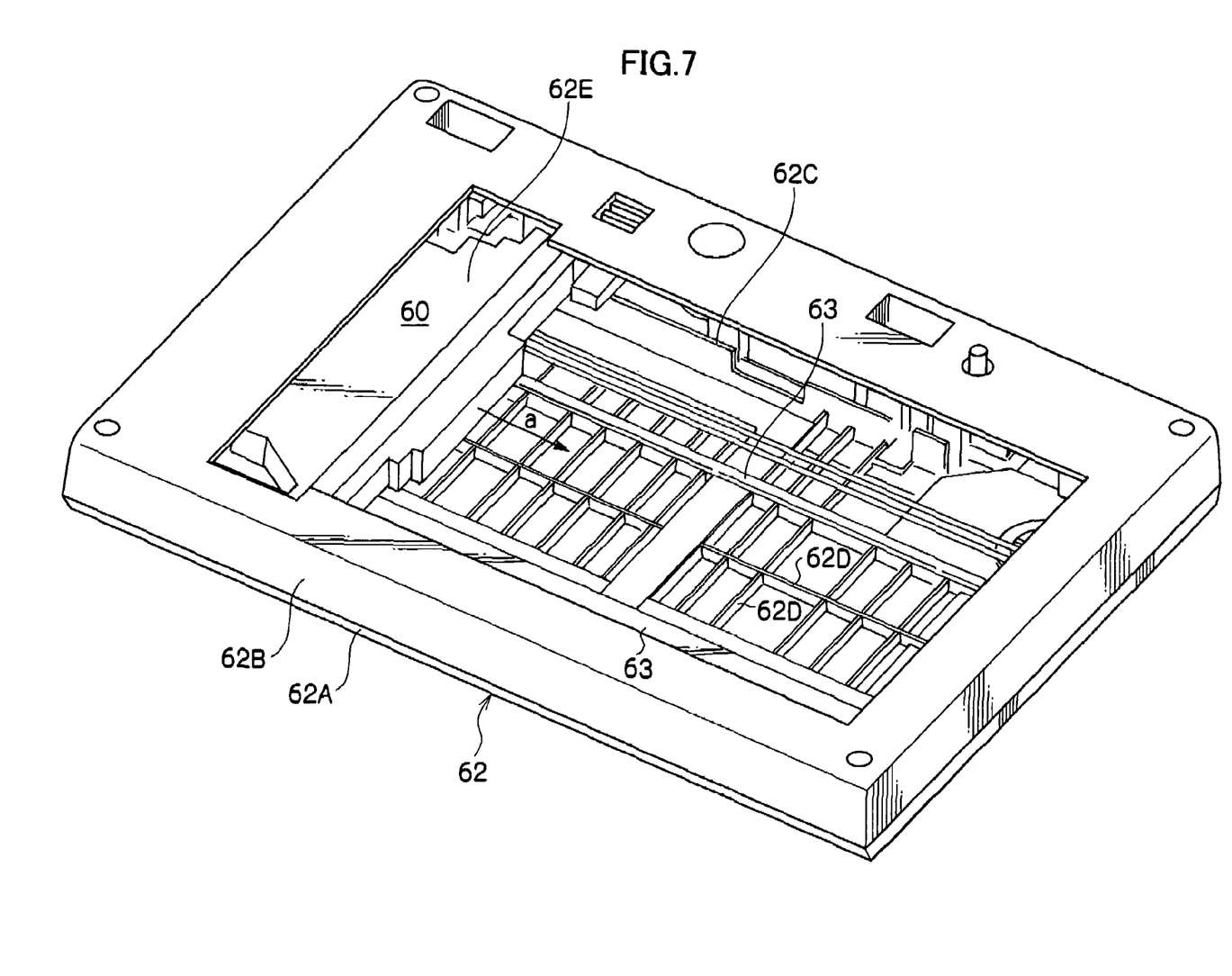
FIG. 7 is a perspective view showing details in regard to the configuration of a portion of a document platen of the scanner with which the digital copier pertaining to the exemplary embodiment is disposed.
Figure 8A:
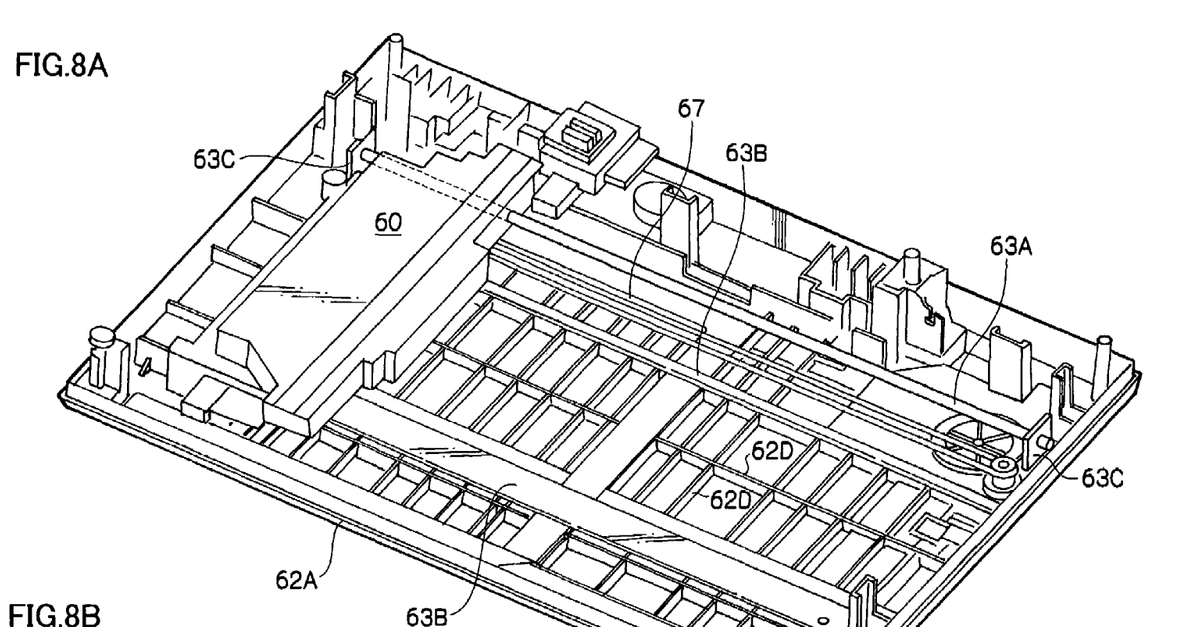
FIGS. 8A and 8B are perspective views showing the configuration of the portion of a bottom plate of the document platen of the scanner with which the digital copier pertaining to the exemplary embodiment is disposed.
Figure 8B:
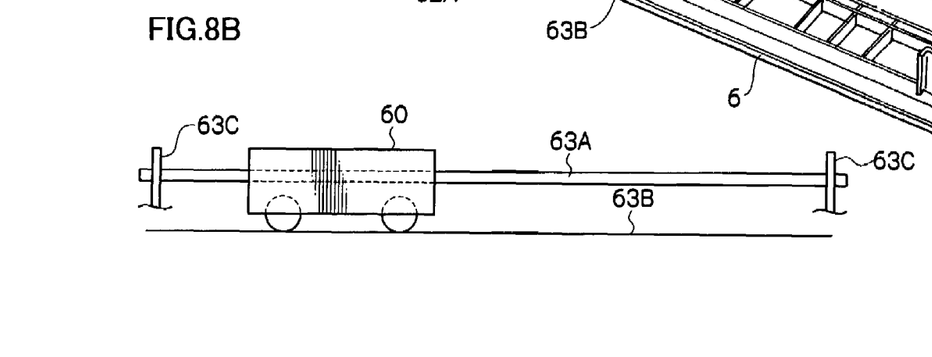

As shown in FIG. 7, FIGS. 8A and 8B, the document platen 62 includes a bottom plate 62A that forms the bottom of the document platen 62 and a casing 62B that covers the bottom plate 62. The bottom plate 62A and the casing 62B are formed by injection-molding synthetic resin. Ribs 62D for reinforcement are disposed on the bottom plate 62A. The ribs 62D are disposed along a direction parallel to, and along a direction at a right angle to, the moving direction a of the image reading carriage 60. A pair of resin rails 63B is formed on the bottom plate 62A, and a shaft-like rail 63A comprising a metal circular cylinder is disposed on the bottom plate 62A via a pair of support portions 63C. The support portions 63C may be formed integrally with the bottom plate 62A or may be formed integrally by attaching separate parts to the bottom plate 62A. The rail 63A is freely fitted into holes in the support portions 63C such that the support portions 63C move in the longitudinal direction of the rail 63A when the bottom plate 62A thermally expands.

A drive belt 67 is disposed along the rail 63A on the bottom plate 62A. The drive belt 67 is rotated by a stepping motor (not shown). Part of the drive belt 67 is fixed to the underside of the image reading carriage 60. The image reading carriage 60 moves in the scanning direction as a result of the drive belt 67 being rotated in one direction and moves in the opposite direction of the scanning direction as a result of the drive belt 67 being rotated in the other direction.

Rollers are disposed on the underside of the image reading carriage 60, and the image reading carriage 60 moves smoothly as a result of the rollers moving on the rails 63B.

An attachment stay 61A and an attachment stay 61B that attach the scanner 6 to the arm-shaped portions 104 are fixed to the underside of the bottom plate 62A. The attachment stay 61A is fixed to the end portion of the bottom plate 62A at the scanning start side, and the attachment stay 61B is fixed to the end portion of the bottom plate 62A at the scanning end side.

Glass windows 62C and 62E are disposed in the upper surface of the casing 62B in the document platen 62. A document placed on the document platen 62 is read by the image reading carriage 60 through the glass window 62C, and a document fed by the document feeding device 64 is read by the image reading carriage 60 through the glass window 62E. The moving direction a of the image reading carriage 60 when reading the image of a document placed on the document platen 62 is the scanning direction of the scanner 6. When the image reading carriage 60 reads a document while the document is being fed by the document feeding device 64, the image reading carriage 60 conducts reading in a stopped state.

Figure 3A:
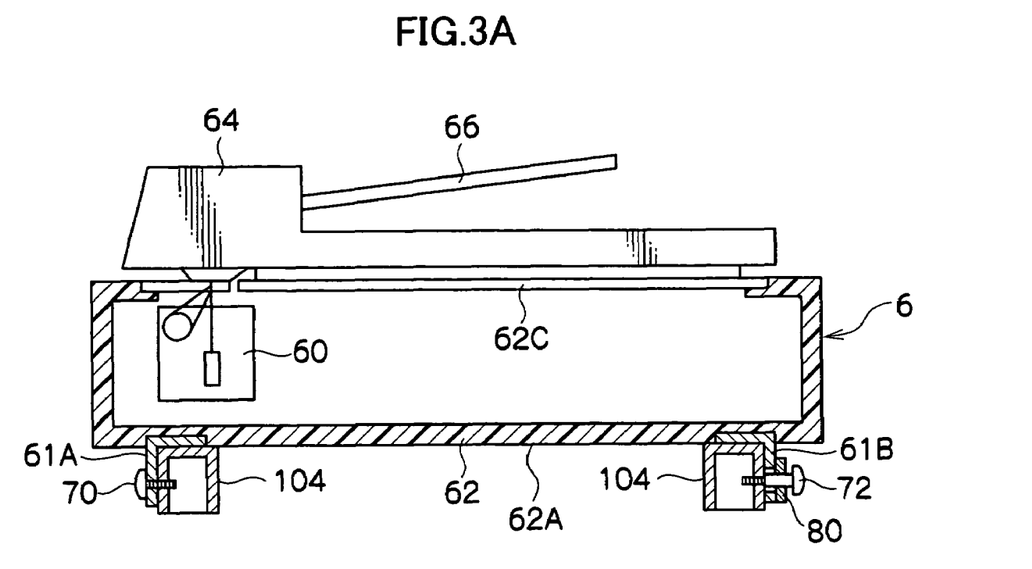
FIGS. 3A and 3B are enlarged views showing a configuration in regard to an example of a scanner attachment portion in the digital copier pertaining to the exemplary embodiment.
Figure 3B:
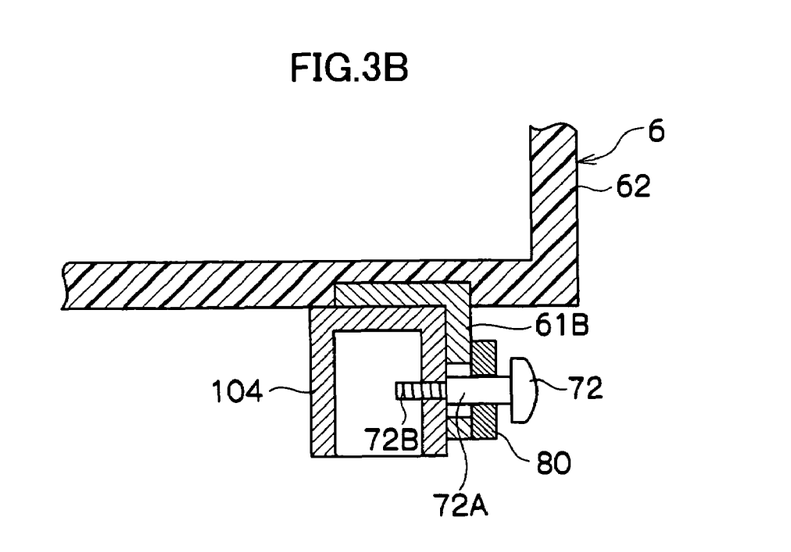

As shown in FIGS. 3A and 3B, the attachment stay 61A is fixed to the upper surface of one of the pair of arm-shaped portions 104 by screws 70. Thus, the end portion of the scanner 6 at the scanning start side is fixed to the arm-shaped portion 104 via the attachment stay 61A. The attachment stay 61A and the screws 70 correspond to a scanner fixing structure in the present invention.

Figure 4:
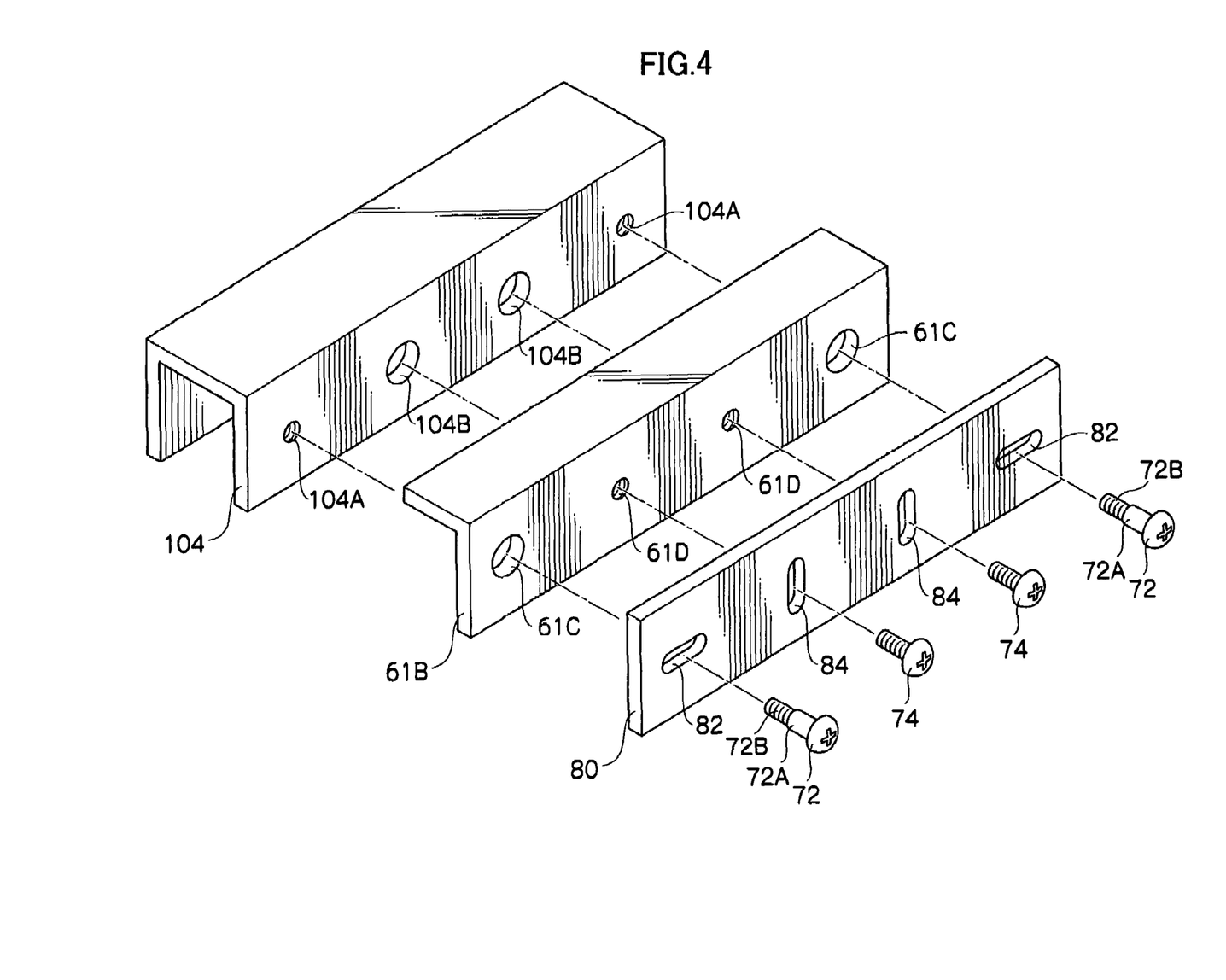
FIG. 4 is an exploded perspective view showing the details of the configuration of the scanner attachment portion shown in FIG. 3B.

As shown in FIGS. 3A and 3B and FIG. 4, the attachment stay 61B is attached such that it is sandwiched between the other arm-shaped portion 104 and an adjustment plate 80.

As shown in FIG. 4, a pair of threaded holes 104A, into which threaded portions 72B of shanked screws 72 are screwed, and clear holes 104B, which are positioned at the inner side of the threaded holes 104A, are formed in the arm-shaped portion 104 to which the attachment stay 61B is attached. A pair of clear holes 61C, through which the shanked screws 72 are passed, and a pair of threaded holes 61D, which are positioned at the inner side of the clear holes 61C, are formed in the attachment stay 61B. The clear holes 61C have inner diameters that are larger than the outer diameters of shank portions 72A of the shanked screws 72. A pair of horizontally long clear holes 82, through which the shanked screws 72 are passed, and a pair of vertically long clear holes 84, which are positioned at the inner side of the clear holes 82 and through which screws 74 are passed, are formed in the adjustment plate 80. The attachment stay 61B, the adjustment plate 80, the shanked screws 72, and the screws 74 correspond to a scanner attachment structure in the present invention.

The screws 74 are screwed into the threaded holes 61D in the attachment stay 61B, and the adjustment plate 80 is fixed to the attachment stay 61B by the screws 74. When the adjustment plate 80 is fixed to the attachment stay 61B, the screws 74 protrude from the attachment stay 61B toward the arm-shaped portion 104 and are passed through the clear holes 104B. It will be noted that the clear holes 104B have inner diameters that are larger than the outer diameters of the screws 74. Here, as mentioned previously, because the clear holes 84 through which the screws 74 are passed are vertically long, the relative height between the attachment stay 61B and the adjustment plate 80 can be adjusted in a state where the screws 74 are loose.

The adjustment plate 80 is attached to the arm-shaped portion 104 by the shanked screws 72 together with the attachment stay 61B. It will be noted that, as shown in FIG. 3B, the length of each of the shank portions 72A of the shanked screws 72A is greater than the combined thickness of the attachment stay 61B and the adjustment plate 80.

The process of fixing the attachment stay 61B to the arm-shaped portion 104 is as follows.

First, the attachment stay 61B is sandwiched between the arm-shaped portion 104 and the adjustment plate 80, the screws 74 are screwed into the threaded holes 61D in the attachment stay 61B, and at the same time the threaded portions 72B of the shanked screws 72 are screwed into the threaded holes 104A in the arm-shaped portion 104.

Next, the attachment stay 61B is moved up and down to adjust the height of the scanner 6 with respect to the arm-shaped portion 104.

When the height of the scanner 6 is decided upon, the screws 74 are tightened to fix the adjustment plate 80 and the attachment stay 61B, and at the same time the shanked screws 72 are tightened to fix the attachment stay 61B in the height direction with respect to the arm-shaped portion 104.

Here, as mentioned previously, because the length of each of the shank portions 72A of the shanked screws 72 is greater than the combined thickness of the attachment stay 61B and the adjustment plate 80, as shown in FIGS. 3A and 3B, a gap is still present between the adjustment plate 80 and the top portions of the shanked screws 72 even when the shanked screws 72 have been tightened. Consequently, because there is play in the scanning direction of the scanner 6, elongation in the scanning direction is absorbed by the play even when the scanner 6 thermally expands due to heat during use.

Figure 5A:
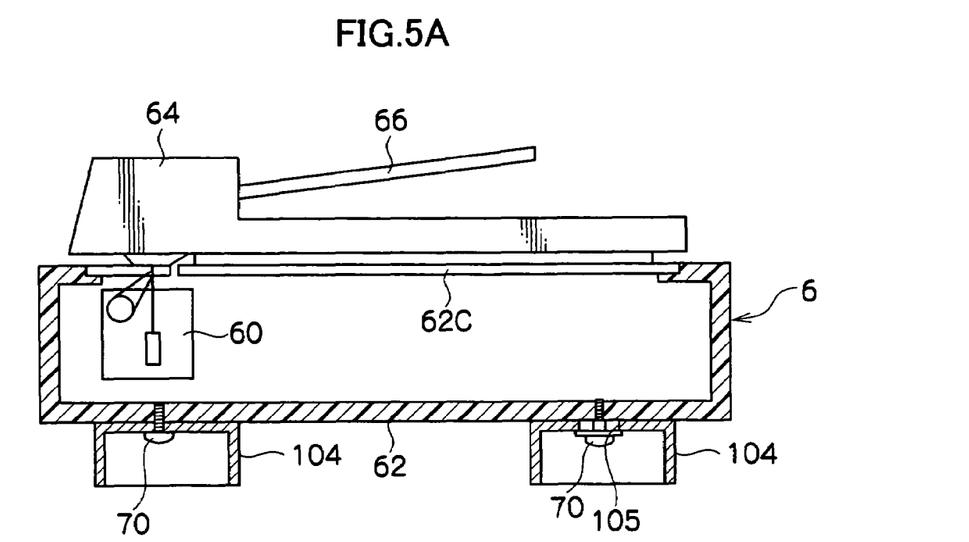
FIGS. 5A and 5B are enlarged views showing a configuration in regard to another example of the scanner attachment portion in the digital copier pertaining to the exemplary embodiment.
Figure 5B:
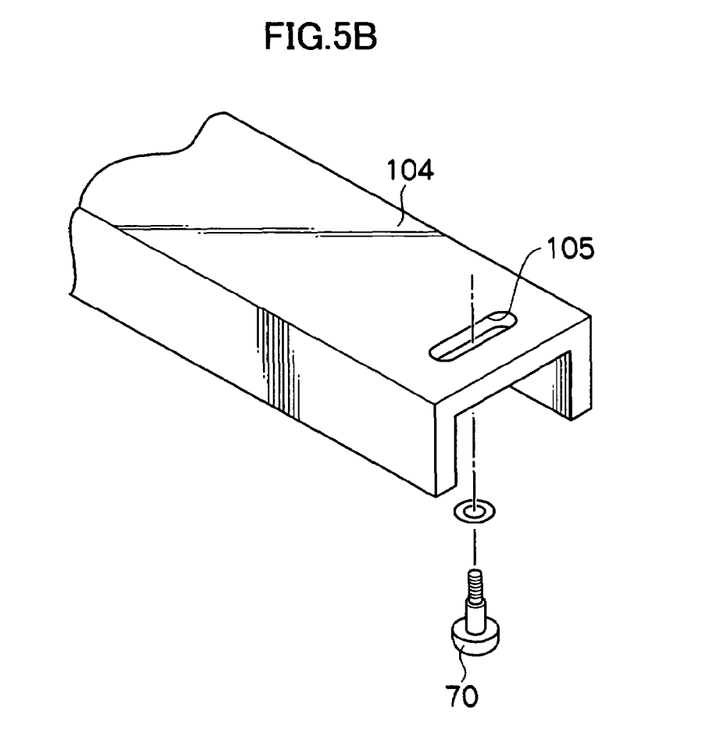

It will be noted that, instead of standing the attachment stay 61A and the attachment stay 61B on the bottom plate 62A of the document platen 62, as shown in FIG. 5A, threaded holes may be directly disposed in the bottom plate 62A such that the arm-shaped portions 104 are fixed by screws 70 from under the arm-shaped portions 104. In the arm-shaped portion 104 at the side supporting the end portion of the scanner 6 at the scanning end side, as shown in FIG. 5B, through holes 105 through which the screws 70 are passed are long holes along the scanning direction. Thus, because play arises along the scanning direction, elongation in the scanning direction is absorbed by the play even when the scanner 6 thermally expands due to heat during use.

Figure 6A:
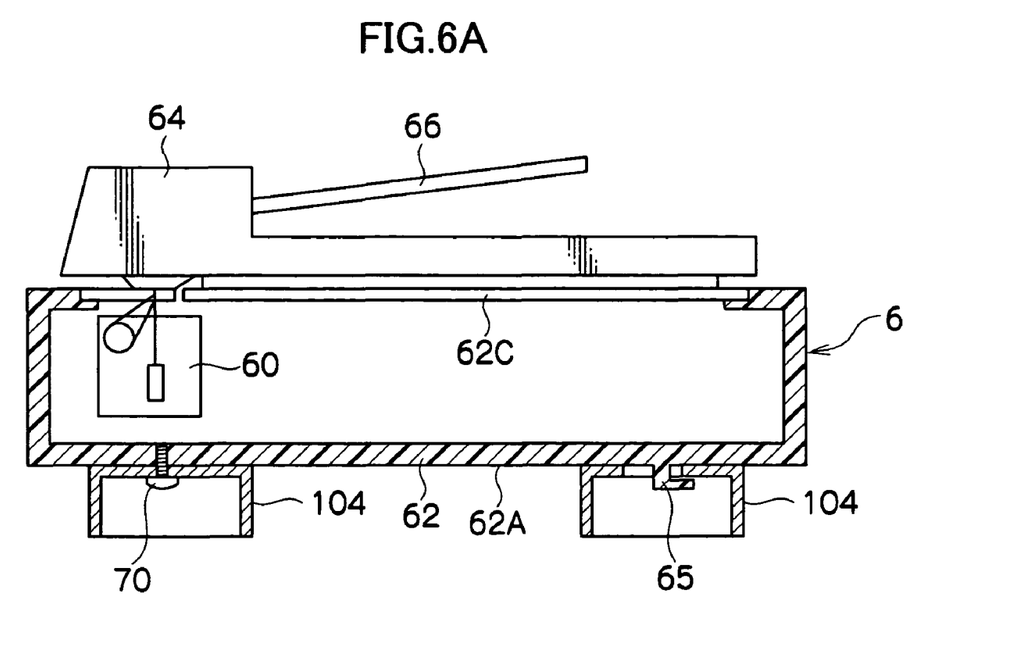
FIGS. 6A and 6B are enlarged views showing a configuration in regard to another example of the scanner attachment portion in the digital copier pertaining to the exemplary embodiment.
Figure 6B:
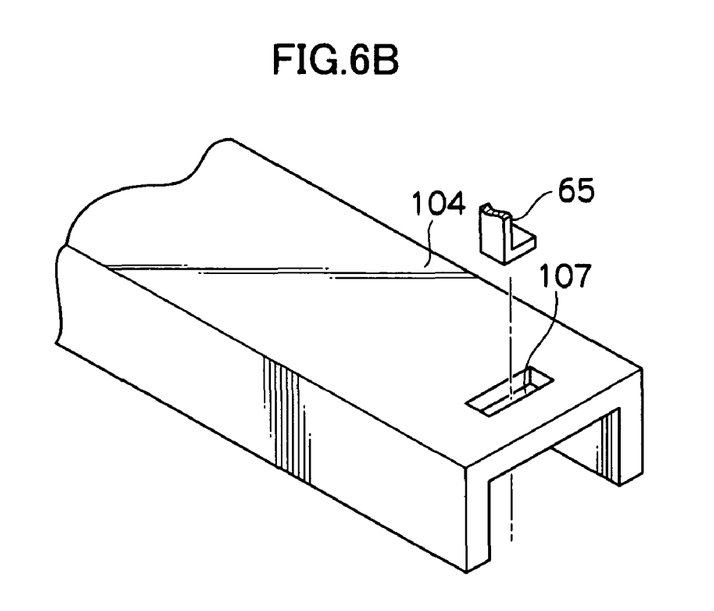

Further, as shown in FIG. 6A, catch members 65 that extend along the scanning direction may be disposed standing on the end portion of the bottom plate 62A of the document platen 62 at the scanning end side, and as shown in FIG. 6B, the catch members 65 may be inserted into insertion holes 107 disposed in the arm-shaped portion 104 that supports the end portion of the scanner 6 at the scanning end side such that the catch members 65 catch on the arm-shaped portion 104. Here, because the insertion holes 107 are also long holes along the scanning direction, play arises along the scanning direction between the catch members 65 and the arm-shaped portion 104. Consequently, elongation in the scanning direction is absorbed by the play even when the scanner 6 thermally expands due to heat during use.

Below, the action of the digital copier 2 will be described.

When a document is read by the scanner 6, the image data is inputted from the scanner 6 to the printer control board 50 of the printer 10 via the scanner control board 51. The printer control board 50 controls the development units 16Y to 16K, the transfer conveyance unit 18, the optical unit 24, the fixing device 38, and the like on the basis of the inputted image data and forms a toner image on the recording paper P by the following process.

First, the recording paper P is removed one sheet at a time from the paper supply cassette 46 by the paper supply roller pair 48 and is fed onto the conveyor belt 34 at a predetermined timing by the registration roller pair 49. The recording paper P fed onto the conveyor belt 34 is electrostatically attracted to and conveyed by the conveyor belt 34 to the image carriers 20Y to 20K of the respective colors.

In the development units 16, first, the surfaces of the image carriers 20 (20Y to 20K) are uniformly charged by the charge rollers 22 (22Y to 22K). Then, laser light (image light) is scanned on the surfaces of the image carriers 20 (20Y to 20K) by the optical unit 24, and electrostatic latent images based on the image data are formed on the surfaces of the image carriers 20 (20Y to 20K). Thereafter, the toner is transferred onto the image carriers 20 (20Y to 20K) by the development rollers 26 (26Y to 26K), and visible images are formed on the surfaces of the image carriers 20 (20Y to 20K).

When the visible images are formed on the surfaces of the image carriers 20 (20Y to 20K) in this manner, the toner images (unfixed images) on the surfaces of the image carriers 20 (20Y to 20K) are transferred by the image carriers 20 (20Y to 20K) and the transfer rollers 36 (36Y to 36K) onto the recording paper P that is attracted to and conveyed by the conveyor belt 34 and passes between the transfer rollers 36 (36Y to 36K) and the image carriers 20 (20Y to 20K). This is conducted in the order of yellow (Y), magenta (M), cyan (C), and black (K), and when a full-color toner image (unfixed image) is transferred onto the recording paper P, the recording paper P is conveyed to the fixing device 38 by the conveyor belt 34.

The unfixed toner image transferred onto the recording paper P conveyed to the fixing device 38 is heated and pressured by the heat roller 40 and the pressure roller 42 and fixed to the recording paper P. Then, the recording paper P to which the toner image has been fixed by the fixing device 38 is discharged into the paper discharge tray 44. It will be noted that after the toner images have been transferred to the recording paper P, the surfaces of the image carriers 20 (20Y to 20K) are cleaned by the cleaning members 28 (28Y to 28K) to prepare the image carriers 20 (20Y to 20K) for the next image creation process.

When the scanner 6 and the printer 10 operate in this manner, a large amount of heat is emitted not only from the printer 10 but also from the scanner 6, but as mentioned previously, because there is play along the scanning direction a at the attachment portion of the scanner 6 at the scanning end side, elongation in the scanning direction is absorbed by this play even when the scanner 6 thermally expands. Consequently, a situation can be prevented where the bottom plate 62A of the scanner 6 bends upward due to thermal expansion, the rails 63B become deformed, and the image reading carriage 60 is not scanned properly.

Further, because the scanner 6 is fixed to the support stand 4 at the end portion at the scanning start side, the relative position of the scanner 6 with respect to the support stand 4 is not shifted by shock when the image reading carriage 60 returns to the scanning start position, and the attachment portion does not sustain damage. Further, because the end portion at the scanning start side is also the end portion at the side where the document feeding device 64 is disposed, the position of the scanner 6 does not become shifted by shock from the document feeding device 64 even when the image reading carriage 60 reads an image while a document is being fed by the document feeding device 64.

Moreover, as long as the attachment portions have the configuration shown in FIGS. 3A and 3B and FIG. 4, the screws 70, the shanked screws 72, and the screws 74 can be tightened from the side of the scanner 6, so the attachment portions also have excellent workability.

An example was described above where the printer 10 was an electrophotographic printer, but the printer 10 may also be an inkjet printer.

The present invention can be applied not only to an image recording apparatus that includes an electrophotographic printer but also to an image recording apparatus that includes an inkjet printer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A support stand comprising:
   scanner attachment portions to which one end portion and the other end portion of a scanner along a scanning direction are attached;
   a scanner fixing structure that fixes the one end portion of the scanner to the scanner attachment portions; and
   a scanner attachment structure that attaches the other end portion of the scanner to the scanner attachment portions such that the other end portion of the scanner is movable along the scanning direction.

2. The support stand of claim 1, wherein the scanner fixing structure and the scanner attachment structure fix or attach the scanner from below the scanner attachment portions.

3. The support stand of claim 1, wherein the scanner fixing structure and the scanner attachment structure fix or attach the scanner from the side of the scanner attachment portions.

4. The support stand of claim 1, wherein
   the scanner attachment portions include insertion holes into which are inserted catch members that are disposed on the underside of the scanner and extend along the scanning direction or the opposite direction of the scanning direction, and
   the insertion holes are formed such that the catch members are relatively movable along the scanning direction or the opposite direction of the scanning direction.

5. A scanner device comprising
   a scanner and a scanner support stand on which the scanner is placed, the scanner support stand including:
  scanner attachment portions to which one end portion and the other end portion of the scanner along a scanning direction are attached;
  a scanner fixing structure that fixes the one end portion of the scanner to the scanner attachment portions; and
  a scanner attachment structure that attaches the other end portion of the scanner to the scanner attachment portions such that the other end portion of the scanner is movable along the scanning direction.

6. The scanner device of claim 5, wherein
  the end portion of the scanner at the side where the scanner is fixed to the scanner attachment portions by the scanner fixing structure is an end portion at a scanning start side where scanning starts, and
  the end portion of the scanner at the side where the scanner is attached to the scanner attachment portions by the scanner attachment structure is an end portion at a scanning end side where scanning ends.

7. The scanner device of claim 5, wherein the scanner includes a document feeding unit that feeds a document in one direction and a document reading unit that reads an image of the document fed by the document feeding unit, and the document feeding unit is disposed at the one end portion side.

8. The scanner device of claim 7, wherein the scanner includes a document platen on which is placed a document whose image is to be read, and when an image of the document placed on the document platen is to be read, the document reading unit reads the image while moving from a scanning start position to a scanning end position.

9. The scanner device of claim 8, wherein the document reading unit includes an optical part, a plurality of rails extend along the moving direction of the document reading unit, and the document reading unit moves along the plurality of rails from the scanning start position to the scanning end position.

10. The scanner device of claim 9, wherein at least one of the plurality of rails comprises resin that is integrally molded with a body of the scanner.

11. The scanner device of claim 9, wherein the plurality of rails are disposed at predetermined intervals in a direction orthogonal to the scanning direction of the document reading unit, and at least one of the plurality of rails comprises a metal circular cylinder, both of whose end portions are supported on a body of the scanner.

12. The scanner device of claim 10, wherein a moving structure is disposed which causes the document reading unit to move in the scanning direction and the opposite direction of the scanning direction, and a rotor that rotates above the at least one rail comprising resin is disposed in the document reading unit.

13. An image recording apparatus including a scanner device comprising a scanner and a scanner support stand on which the scanner is placed, the scanner support stand comprising:
  scanner attachment portions to which one end portion and the other end portion of the scanner along a scanning direction are attached;
  a scanner fixing structure that fixes the one end portion of the scanner to the scanner attachment portions; and
  a scanner attachment structure that attaches the other end portion of the scanner to the scanner attachment portions such that the other end portion of the scanner is movable along the scanning direction,
  wherein the image recording apparatus includes an image forming unit that forms an image on the basis of image signals from the scanner with which the scanner device is disposed.

14. The image recording apparatus of claim 13, wherein the image forming unit is an electrophotographic printer.

15. The image recording apparatus of claim 13, wherein the image forming unit is an inkjet printer.

16. A support stand comprising:
  scanner attachment portions to which one end portion and the other end portion of a scanner along a scanning direction are attached;
  scanner fixing means that fixes the one end portion of the scanner to the scanner attachment portions; and
  scanner attachment means that attaches the other end portion of the scanner to the scanner attachment portions such that the other end portion of the scanner is movable along the scanning direction.

* * * * *